United States Patent [19]
van der Lely

[11] 3,721,077
[45] March 20, 1973

[54] TRACTORS
[76] Inventor: Cornelis van der Lely, 7, Bruschenrain, Zug, Switzerland
[22] Filed: Oct. 3, 1969
[21] Appl. No.: 863,486

[30] Foreign Application Priority Data

Oct. 7, 1968 Netherlands ..................6814307

[52] U.S. Cl..............56/15.6, 56/228, 56/DIG. 9, 180/77 S, 182/2, 280/504, 296/35 A
[51] Int. Cl. ............................................A01d 75/22
[58] Field of Search ......56/328 R, 228, 15.6, DIG. 9; 182/2; 180/77 S; 296/28 C, 35, 35 A; 280/504

[56] References Cited

UNITED STATES PATENTS

| 2,482,741 | 9/1949 | Carmichael | 280/504 |
| 2,727,757 | 12/1955 | Sawyer et al. | 280/504 |
| 3,119,503 | 1/1964 | Herpich et al. | 296/35 A X |
| 3,172,686 | 3/1965 | Beard | 280/504 X |
| 3,479,804 | 11/1969 | De Pauw et al. | 56/15.6 UX |
| 3,539,203 | 11/1970 | Baugh | 280/504 |
| 2,616,768 | 11/1952 | Stemm | 56/328 R |
| 2,833,367 | 5/1958 | Pool et al. | 182/2 X |
| 2,998,861 | 9/1961 | Hotchkiss | 182/2 |
| 3,319,739 | 5/1967 | Morse | 182/2 |
| 3,332,513 | 7/1967 | Wiebe | 182/2 X |
| 3,379,279 | 4/1968 | Slusher | 182/2 X |
| 3,420,568 | 1/1969 | Henriksson et al. | 296/35 R |

FOREIGN PATENTS OR APPLICATIONS

| 647,340 | 8/1962 | Canada | 182/2 |
| 989,301 | 9/1951 | France | 180/77 S |
| 1,167,774 | 11/1958 | France | 180/77 S |

Primary Examiner—F. Barry Shay
Assistant Examiner—J. A. Oliff
Attorney—Mason, Mason & Albright

[57] ABSTRACT

A tractor includes a frame on wheels and a driver's platform which is adjustably connected to the tractor and movable relative to the frame so that various implement attachments can be placed on the upper surface of the tractor at least partly above the frame. Coupling members, including lifting cylinders are connected to the frame to position and secure the attachments to the tractor.

16 Claims, 18 Drawing Figures

TRACTORS

This invention relates to a tractor comprising a frame, a driver's platform and an engine, the frame being supported from at least two ground wheels on the right-hand side and at least two ground wheels on the left-hand side of the frame, which wheels can be driven via a transmission mechanism of by the engine.

In known tractors of this kind the driver's platform usually has a fixed position relative to the frame, while the implements are in general constructed so that, when coupled with the tractor, they are located in operation at the side of or behind the tractor. The possibilities of use of the tractor and the structural variants of the implements to be employed with the tractor are thus restricted.

According to the invention the tractor comprises coupling means for attaching implements to the frame so that at least part of the attached implement may be located above the frame, whereas the driver's platform is displaceable with respect to the frame and can be set in a position of operation in which, viewed in the longitudinal direction of the tractor the platform is located inside the outlines of the tractors and/or inside the outlines of the attached implement. In this way very advantageous combinations of tractor and implements can be achieved.

According to a further aspect of the invention in a tractor comprising a frame supported from at least three ground wheels and extending at least partly between two ground wheels, one on each side of the tractor, a driver's platform and coupling means for attaching one or more implements, the platform is coupled with the frame so as to be adjustable in a direction of height with the aid of at least one support provided on the side of the frame, the arrangement being such that at least parts of the implement to be attached to the tractor can be arranged beneath the seat and above the frame. This also permits of obtaining a particularly advantageous combination of the tractor with one or more agricultural implements.

For a better understanding of the invention and to show how the same may be carried into effect, reference is made by way of example to the accompanying drawings.

Figure 1:
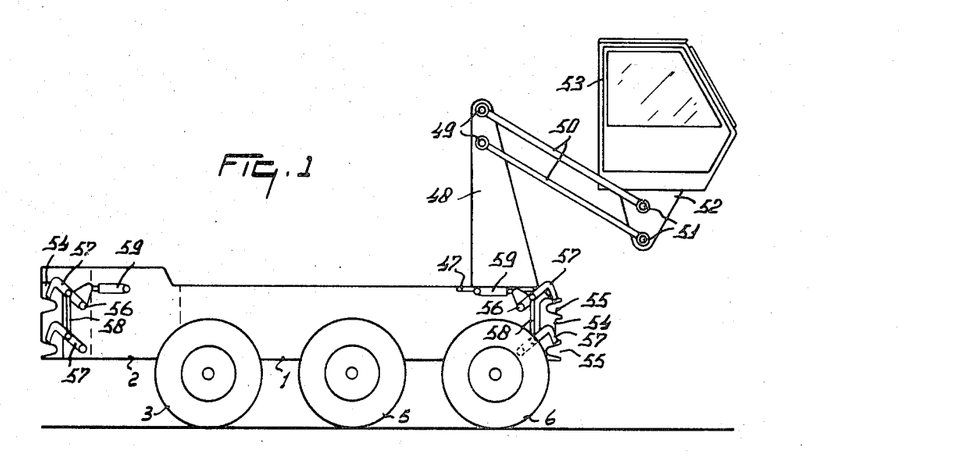
FIG. 1 is a side elevation of a tractor according to the invention.

The frame of the tractor shown in FIG. 1 is formed at least mainly by a square-section hollow beam 1 and an engine compartment 2, which is integral with said beam. The frame is supported from six ground wheels. The ground wheels 3, located near the engine compartment on either side of the frame 1, are coupled with the frame with the aid of axle casings 4 so as to be immovable in a direction of height. The two central ground wheels 5 and the ground wheels 6, located at the side thereof, are connected with the frame so as to be movable in a direction of height. The wheels 3 and 6 are steerable.

Figure 3:
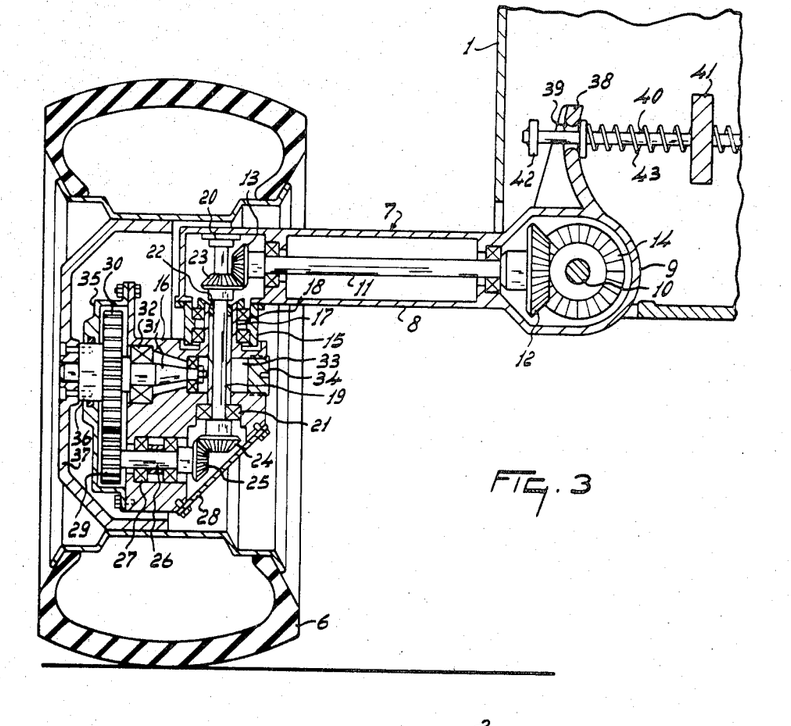
FIG. 3 shows on an enlarged scale the fastening of a steerable ground wheel.
Figure 4:
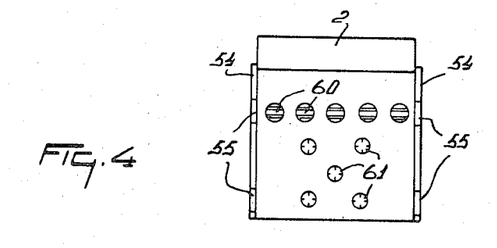
FIG. 4 is a rear view of the tractor shown in FIG. 1, with the ground wheels omitted.

The arrangement of a vertically movable and steerable ground wheel 6 is shown in FIG. 3 in detail. For fastening the ground wheel 6 to the frame, the latter is provided with an arm 7 including an axle casing 8, which is secured at one end to a gear box 9. The gear box 9 is adapted to turn about a shaft 10, extending in the longitudinal direction of the frame beam 1. As will be apparent from FIG. 3, the shaft 10 is located near the bottom side and on one side of the frame beam 1. The arm 7 is passed through an opening in the frame beam. The axle casing 8 accommodates a shaft 11, to the two ends of which bevel gear wheels 12 and 13 respectively are secured. The teeth of the bevel gear wheel 12 engage the teeth of a bevel gear wheel 14, secured to the shaft 10.

The end of the axle casing 8 is provided with a bushing 15, the vertical center line of which is at right angles to the shaft 8. The bushing 15 accommodates a bushing 17, which is integral with a housing 16. The bushing 17 is supported from bearings 18 in the bushing 15. A vertical shaft 19 extends over part of its length across the bushing 17 and the upper end of the shaft 19 is held by a bearing 20, secured to the axle casing 8. Near its lower end the shaft 19 is held by a bearing 21 in the housing 16. The shaft 19 is furthermore supported in the bushing 17 by a bronze or nylon sleeve 22. The portion of the shaft 19 located above the bushing 17 is provided with a bevel gear wheel 23, whose teeth engage the teeth of the bevel gear wheel 13.

The lower end of the shaft 19 is provided with a bevel gear wheel 24. The teeth of the bevel gear wheel 24 are in mesh with the teeth of the bevel gear wheel 25, secured to a shaft 26. The shaft 26 is journalled by means of bearings 27 in a bore provided in the housing 16. The recess of the housing 16 accommodating the two gear wheels 24 and 25 is closed by a cover-plate 28. The end of the shaft 26 projecting from the housing 16 is provided with a square gear wheel 29. The teeth of the gear wheel 29 are in mesh with those of a gear wheel 30, secured to a shaft 31, extending parallel to the shaft 26. The shaft 31 is also journalled with the aid of bearings 32 in a recess 33 of the housing 16. The recess 33 is closed at one end by a bolt 34.

The gear wheels 29 and 30 are located between one side of the housing 16 and a cover 35 secured to the housing 16. A hub 36, which is integral with the gear wheel 30, is passed through an opening in the cover 35. The hub 36 is provided with a wheel hub 37. The wheel 6 is arranged on the hub.

The arm 7 is furthermore provided with an upwardly extending support 38. The support 38 has an opening through which a rod 40 is taken. The rod 40 is furthermore taken through an opening in a vertical partition 41 at the center of the frame beam 1 and through the opening 39 of the arm corresponding with the support 38 and associated with the ground wheel located on the other side of the frame. The ends of the rod 40 are provided with stops 42. The portion of the rod 40 located between the support 38 and the plate 41 is surrounded by a compression spring 43 so that the wheels are capable of deflecting resiliently in upward direction with respect to the frame.

The steerable wheels 3 and 6, located one on each side of the frame, are intercoupled with the aid of a control-rod 44.

At the level of the wheels 3 the frame beam accommodates a differential gear 45, which is coupled through a change-speed gear or hydraulic change-speed gear with the engine. The differential gear 45 is linked through bevel gear wheel transmissions 46 to the two shafts 10, extending in the longitudinal direction of the frame and being coupled in the manner described above with the six driven wheels 3, 5 and 6.

Near the wheels 6 plates 47 are located flush with the upper side of the frame beam 1 and extend on either side from the beam 1. The free ends of the plates are provided with vertical supports or plates 48. Near the upper ends of the plates 48 two stub shafts 49 are located one above the other and extend horizontally at right angles to the longitudinal direction of the tractor. Forwardly projecting arms 50 are adapted to turn about the stub shafts 49. The front ends of the arms 50 are pivoted with the aid of stub shafts 51, extending parallel to the stub shafts 49, to a support 52, located between the arms. The support 52 holds a closed driver cabin 53, which is adapted to turn about a vertical shaft and to be fixed in a plurality of positions and provided with a seat for the tractor driver. The stub shafts 49 and 51 are located at the corners of a parallelogram. The arms 50 are adapted to pivot with respect to the tractor frame with the aid for example of a hydraulic steering cylinder, which can be actuated from the driver cabin so that the chain may be adjusted to different heights above the ground.

The sides of the frame, near the ends thereof, are provided with plates 54 having V-shaped recesses 55, located one above the other. Near the plates the frame has pivoted to it hooks 57 by means of horizontal stub shafts 56, extending at right angles to the longitudinal direction of the frame. Two hooks 57, lying one above the other, are interconnected by means of a coupling rod 58, pivoted to said hooks. The upper hook of each pair of adjacent hooks is coupled with a hydraulic lifting cylinder 59, by means of which the hooks can be turned about the stub shafts 56. Implements to be employed in conjunction with the tractor are preferably provided with pins fitting in the recesses 55. The pins coupled with the implements can be held by means of hooks 57 in the recesses 55 so that quick attachment of the implements is possible.

The hooks 57 are preferably easily detachable and exchangeable against hooks or arms of different shapes, provided at their ends with eyelets as employed in conventional lifting devices. Also the plates 54 are preferably arranged so as to be readily detachable so that, for example, plates having differently shaped recesses can be rapidly and simply coupled with the frame.

Near the two ends the frame comprises furthermore five adjacent, horizontal hydraulic lifting cylinders 59, the ends of the piston rods 60 thereof projecting from the frame. The ends of the piston rods are constructed so that they may be coupled with components of an attachment of the tractor so that with respect to the tractor frame and/or to the other parts of the attached implement said components can be displaced with the aid of the lifting cylinders.

Near each end of the tractor five take-off shafts 61 are provided, which can preferably be driven with different speeds. In order to permit a quick attachment of the implements the take-off shafts are preferably provided with parts of claw-couplings, which are adapted to deflect in an axial direction by spring pressure with respect to the take-off shafts and to co-operate with parts of claw-couplings provided on the implements to be attached so that these couplings are operative as quick-action couplings.

Figure 2:
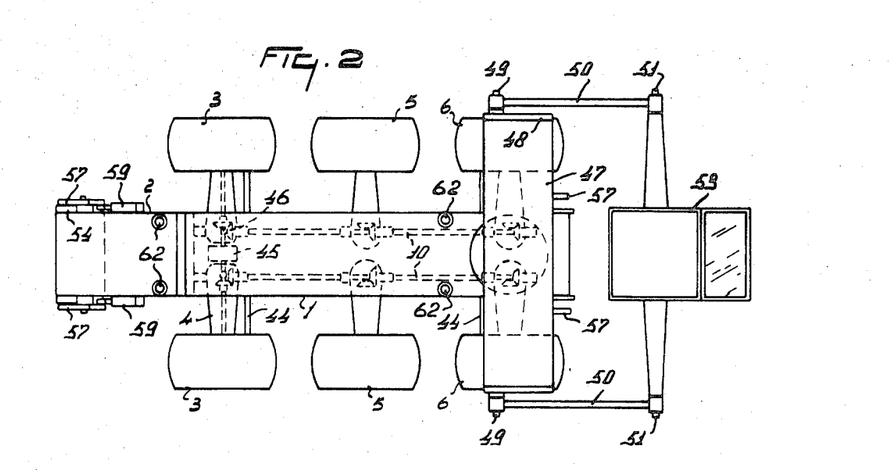
FIG. 2 is a plan view of the tractor of FIG. 1.

The frame comprises furthermore four vertical, hydraulic lifting cylinders 62, the piston rods of which project above the frame in the extended position. As will be seen from FIG. 2, the vertical cylinders are located near the frame sides, two cylinders being arranged near the engine compartment and two cylinders being located between the wheels 5 and 6, viewed in the longitudinal direction of the wheel axles.

An advantageous dimension of the wheels supporting the tractor is obtained by choosing a wheel diameter of about 1 meter and a width of a wheel of about 50 cms. Even if comparatively heavy implements are attached to the tractor, a comparatively low pressure on the ground can be obtained, whilst the engine power, which is preferably 200 to 300 HP, can be fully utilized. The width of the tractor is preferably 250 cms so that broad implements can be attached and the tractor is nevertheless stable in operation.

Control of the various tractor parts and steering can be performed from the driver cabin 53. The control-member required for steering are preferably taken through the preferably hollow arms 50, and as an alternative separate cables or conductors may be arranged between the supporting member 52 and the frame and be pivotally coupled both with the control-members and with the frame so that they do not hinder the vertical adjustment of the driver cabin.

The driving mechanism is preferably constructed so that the tractor is capable of travelling in two directions with the same speeds. It is then advantageous that the driver cabin can be turned about a vertical axis and be fixed in a plurality of positions so that the tractor driver will always be able to supervise satisfactorily the implements attached to the frame in the direction of travel.

Figure 5:
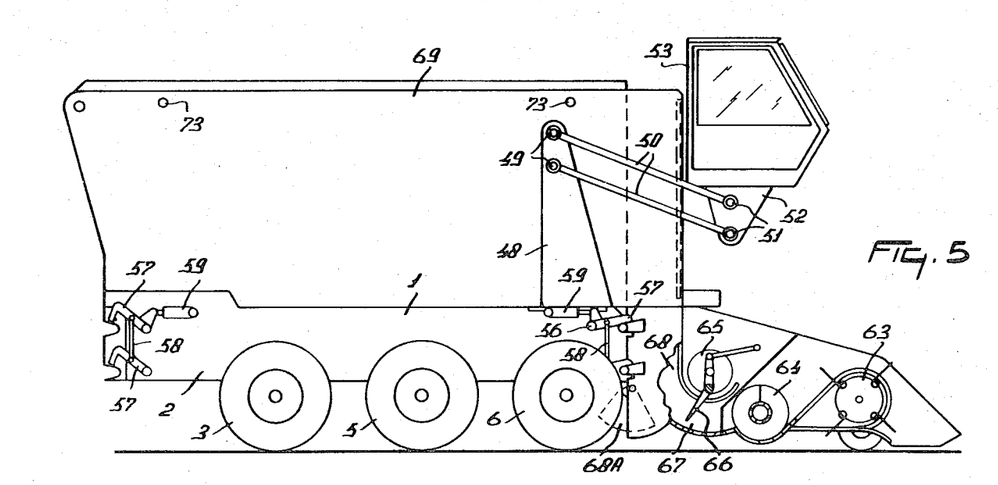
FIG. 5 shows the fastening of an implement to the tractor.
Figure 6:
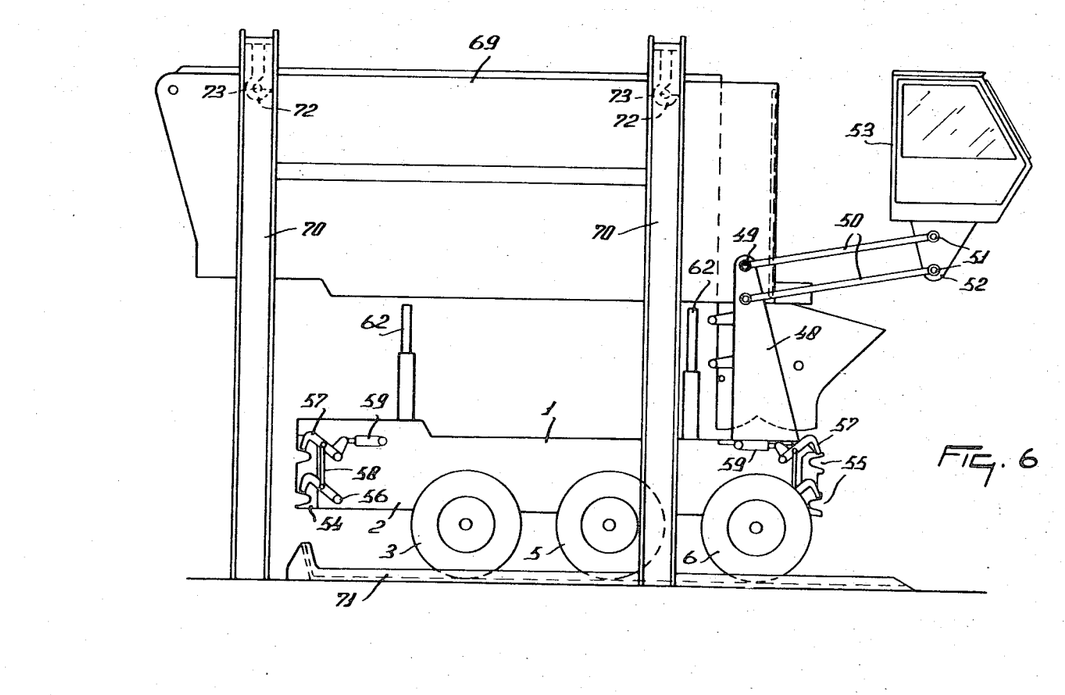
FIG. 6 shows a system for attaching an implement to the tractor.

FIGS. 5 and 6 show the tractor described above combined with an implement. This implement comprises a pick-up member 63, by means of which crop lying on the ground can be lifted and fed to worm conveyors 64. Behind the worm conveyors 64 pushing members 65 are arranged whose tines 66 are located in feeder channels 67. Each feeder channel 67 communicates with a compression chamber 68, in which a compression ram 68A is adapted to reciprocate. The vertical channels, shown in dotted lines, open out in a loading trough 69, the width of which is approximately equal to the distance between the two supports 48. The arrangement is such that a channel 68B opens out on either side at the front of the loading trough 69. The foremost portions of the sidewalls of the loading trough 69 are adapted to reciprocate transversely of the direction of length of the wagon with the aid of means (not shown), while the front wall of the loading trough can be shifted forwards and backwards in the direction of length of the loading trough also by means not shown.

In operation the pick-up member 63, whose width may markedly exceed the width of the tractor, will lift the crop and feed it to the worm conveyors 64. By means of the worm conveyors 64 the crop is displaced laterally transversely of the longitudinal axis of the tractor and moved within reach of the pushing members 65, which feed the crop to the compression ram 68A. With the aid of the ram 68A the crop is compressed in the compression chamber 68 into bales and by means of a mechanism (not shown) it is collected in known manner. The bales thus obtained are shifted in a vertical direction into the loading space and displaced by means of the movable parts of the sidewalls to the center of the wagon. When a stack of bales is formed over the whole width of the loading trough 69, the stack can be moved backwards by means of the movable front wall. In this manner the whole loading trough can be filled.

The drive of this combined machine which is capable of picking up crop, compressing it into bales and pushing it into a loading trough, is obtained from the power take-off shafts of the tractor.

When the machine has to be removed from the tractor, first the machine part comprising the worm conveyors 64 and the pick-up member 63, the width of which is materially larger than the distance between the two supports 48, is discoupled from the further machine part. Then the tractor is maneuvered into a porch 70 (FIG. 6). In order to ensure the correct position of the tractor relative to the porch, gutters 71 are provided for guiding the tractor wheels. The loading trough 69 and the compression members attached hereto can be lifted by means of the vertical hydraulic cylinders 62 and in the lifted position hooks 72 of the loading porch grip around pins 73, secured to the loading trough 69. After the piston rods of the cylinders 62 have been withdrawn, the tractor can be driven from beneath the loading trough. Since the driver cabin is adjustable in a direction of height, there is no risk of contact of parts of the loading trough during the lift with the driver cabin.

Figure 7:
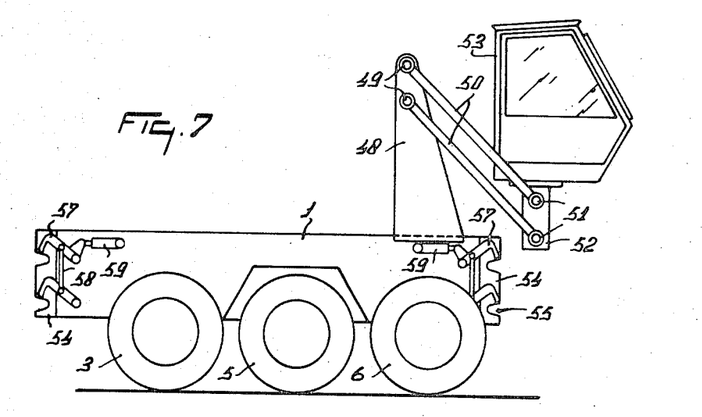
FIG. 7 shows a second embodiment of a tractor in accordance with the invention.
Figure 8:
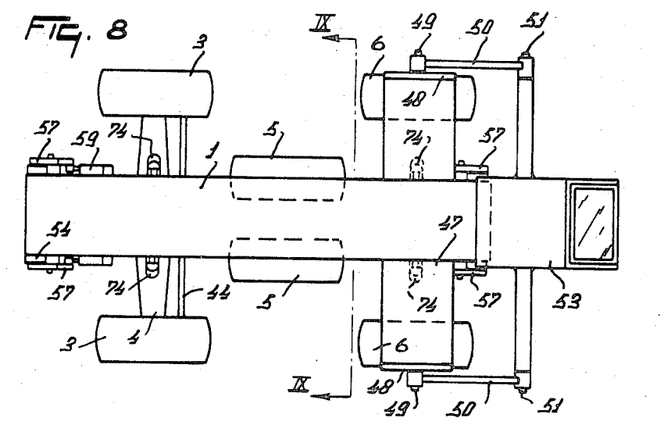
FIG. 8 is a plan view of the tractor shown in FIG. 7.
Figure 9:
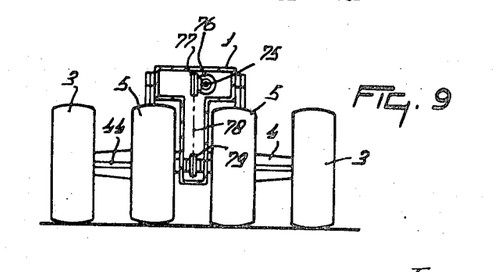
FIG. 9 is a sectional view taken on the line IX—IX in FIG. 8.

The tractor shown in FIGS. 7 to 9 corresponds largely with the tractor described above. Corresponding parts are designated by the same reference numerals.

Viewed in the direction of travel of the tractor, the central wheels 5 of this embodiment are located between the wheels 3 and 6 so that the distance between the wheels 5 is comparatively small. In order to permit of arranging the wheels 5 at a comparatively short distance from each other, the frame beam 1, as will be apparent from FIG. 9, has an approximately T-shaped section at the place of the wheels. The wheels 5 are journalled on an axle rigidly secured in the frame, whereas the wheels 3 and 6 are coupled with the frame in the manner described above so as to be movable in a direction of height. In order to improve the supporting effect shock absorbers 74 are provided between the arms 7 and the frame.

For driving the wheels a shaft 75 is provided near the upper side of the frame beam 1 so as to extend in the direction of length of said frame beam. Near each set of wheels, through a bevel gear wheel transmission 76, said shaft is coupled with a sprocket wheel 77. The chain sprocket 77 is coupled by means of a chain 78 with a sprocket 79, which is secured to a differential gear located between the wheels concerned, through which the wheels are driven.

In this embodiment the upper side of the engine compartment and the upper side of the further frame part are co-planar. The disposition of the ground wheels 5 described above has the advantage that three or six implements can be coupled in a simple manner with the frame between the foremost and hindmost ground wheels.

Figure 10:
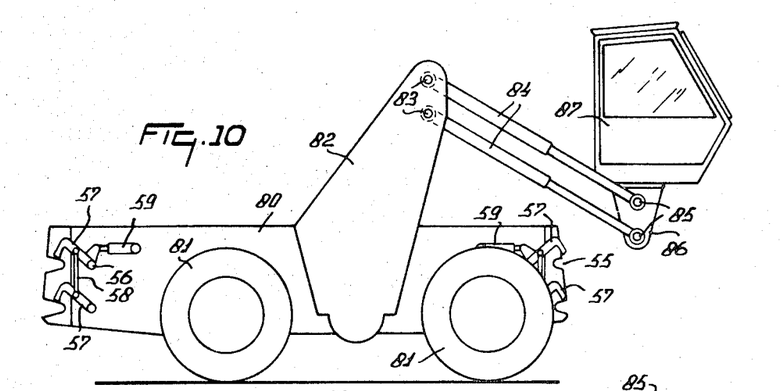
FIG. 10 shows a third embodiment of a tractor in accordance with the invention.
Figure 11:
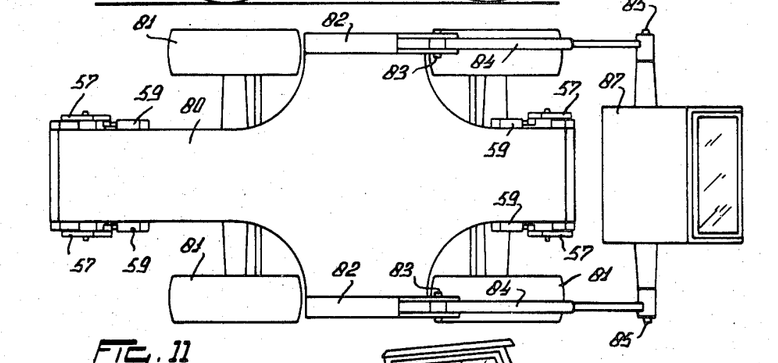
FIG. 11 is a plan view of the tractor shown in FIG. 10.

In the embodiment shown in FIGS. 10 and 11 the frame is also formed by a hollow casing 80. The frame is supported from four steerable wheels 81, which are coupled with the frame 80 in a manner similar as that described for the preceding embodiment. The frame is provided with coupling members similar to those of the preceding embodiment and corresponding parts are designated by the same reference numerals.

The central part of the frame, located on plan between the wheels arranged one behind the other, has a larger width than the further part of the frame and extends to near the vertical planes going through the distal sides of the wheels supporting the frame. The central part is provided with upwardly extending supports 82, to which arms 84 are pivoted with the aid of horizontal stub shafts 83 lying one above the other and extending at right angles to the longitudinal direction of the tractor. The ends of the arm 84 remote from the stub shafts 83 are secured to a support 86 with the aid of stub shafts 85. In a manner similar to that described for the preceding embodiment the support 86 holds a driver cabin 87, adapted to turn on a vertical shaft. The arms 84 of this embodiment are telescopic so that the position of the driver cabin relative to the frame can be changed not only by turning the arms 84 about the stub shafts 83 but also by varying the lengths of the arms 84.

Figure 12:
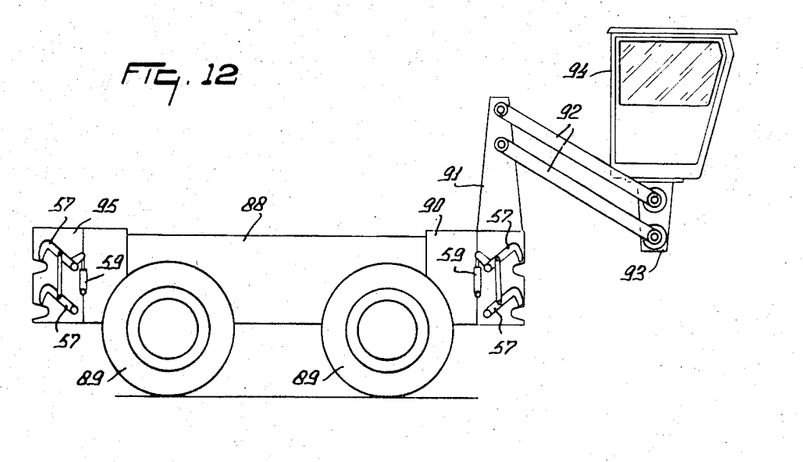
FIG. 12 shows a fourth embodiment of a tractor in accordance with the invention.
Figure 13:
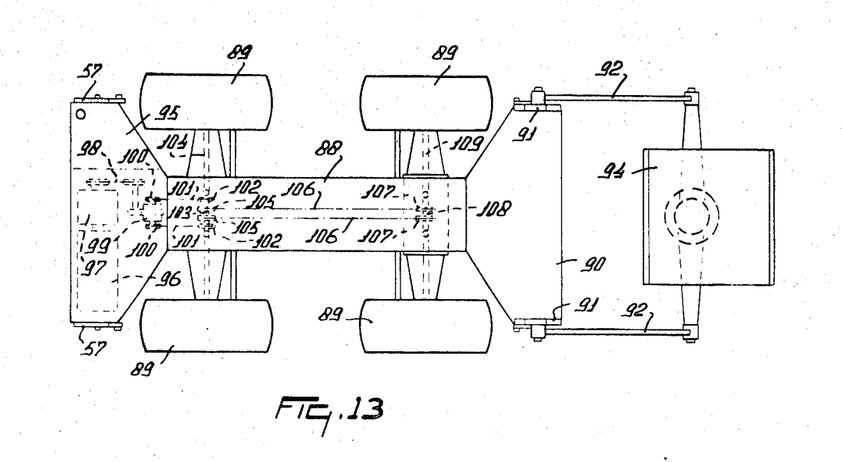
FIG. 13 is a plan view of the tractor shown in FIG. 12.

The frame of the tractor shown in FIGS. 12 and 13 comprises a central hollow beam 88, with which four steerable wheels 89 are coupled in a similar manner as described for the first embodiment.

One end of the hollow beam 88 is provided with a casing 90, which extends transversely in front of the wheels 89 secured to said ends. To the sides of the casing 90 are secured upwardly extending supports 91, to which arms 92 are pivoted in a manner similar to that of the preceding embodiments. Between the ends of the arms 92 remote from the supports 91 a support 93 is pivotally arranged for holding a driver cabin 94, which is adapted to be adjusted about a vertical axis and to be fixed in a plurality of positions.

The other end of the hollow beam 88 is provided with a casing 95 similar to the casing 90. The casing 95 accommodates a driving engine 96, the longitudinal axis of which is at right angles to the tractor. A change-speed gear 97 is coupled with the engine 96. The change-speed gear 97 is coupled via a chain transmission 98 with a differential gear 99. The outgoing shafts of the differential are provided with chain sprockets 100, each of which is linked by a chain 101 to a chain sprocket 102, adapted to rotate about a shaft 103, journalled in the frame beam 88. The chain sprockets 102 are coupled by means of auxiliary shafts 104 with the wheels 89 located near the casing 95. Each chain sprocket 102 has secured to it a chain sprocket 105. The chain sprockets 105 are linked by chains 106 to chain sprockets 107, arranged near the casing 90 in the frame beam 88 and adapted to rotate about a shaft 108, arranged in the frame. The chain sprockets 107 are coupled with the aid of auxiliary shafts 109 with the wheels located near the casing 90.

Also in this way a tractor can be obtained which is particularly suitable for the attachment of implements, the upper side of the frame being located at least approximately in the same plane as the highest points of the wheels so that the attachment of implements is facilitated.

Figure 14:
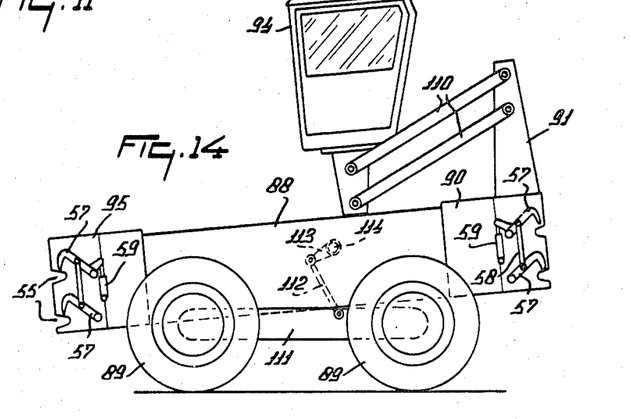
FIG. 14 shows a fifth embodiment of a tractor in accordance with the invention.

The construction of the tractor shown in FIG. 14 corresponds substantially with that of the tractor shown in FIGS. 12 and 13. However, in this embodiment the arms 110 extend with respect to the supports 91 in a different direction than in the preceding embodiment, so that the driver cabin 94 of this embodiment is located above the frame. The wheels 89, located near the casing 90, are fastened to supports 111, which are adapted to pivot about the arms supporting the ground wheels 89 located near the casing 95. The ground wheels 89, fastened to the supports 111 are driven through chains accommodated in the supports 111. Coupling rods 112 are connected with the supports 111 and connected with arms 113. The arms 113 are fastened to shafts 114, journalled in the frame and adapted to be pivoted by means of lifting cylinders. The wheels 89 located near the casing 90 can be adjusted with the aid of the lifting cylinders in a direction of height with respect to the frame so that the frame can be fixed in a plurality of positions relative to the ground, which may be advantageous with the use of specific tools or in working on hilly land.

Figure 15:
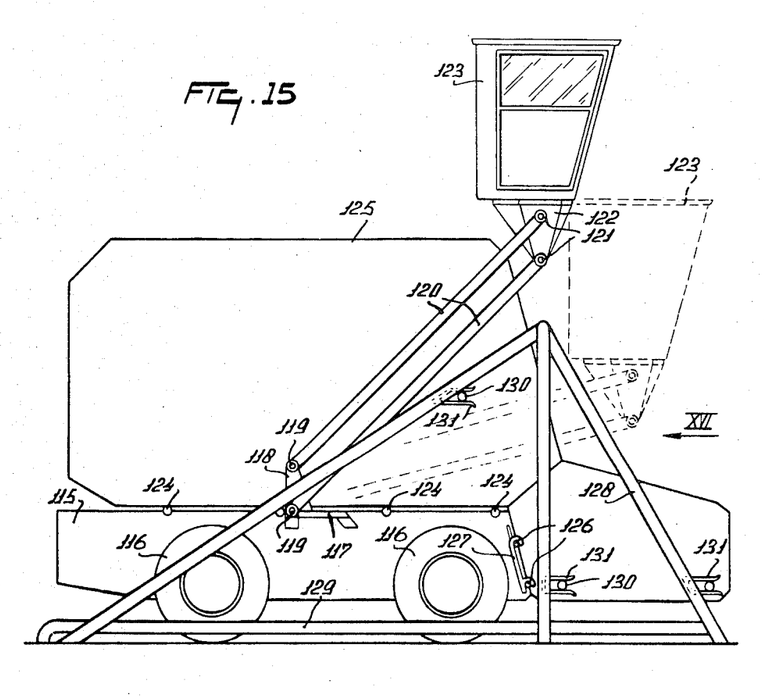
FIG. 15 shows a sixth embodiment of a tractor in accordance with the invention, while schematically an implement attached to the tractor and a system for attaching said implement are shown.
Figure 16:
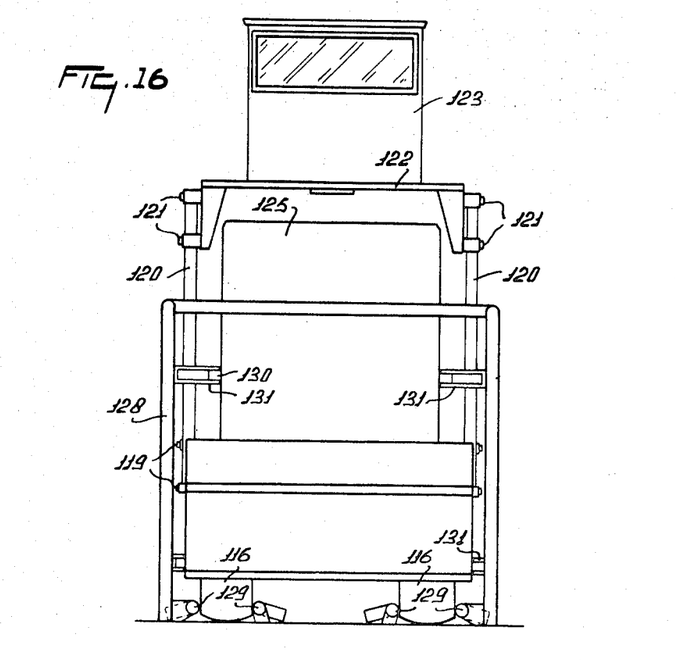
FIG. 16 shows schematically an elevation in the direction of the arrow XVI in FIG. 15.
Figure 17:
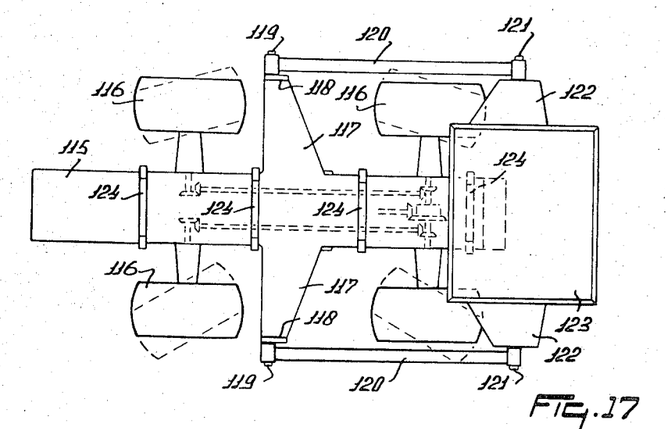
FIG. 17 is a plan view of the tractor shown in FIG. 15 without implements.

The tractor shown in FIGS. 15 to 17 comprises also a frame formed by a hollow beam 115, held by four steerable ground wheels 116, which are connected with the frame in the manner described above. The frame has fastened to it two outwardly extending plates 117, located on plan between the wheels and having at its ends upwardly extending supports 118. With the aid of horizontal stub shafts 119, lying one above the other and extending at right angles to the longitudinal direction of the tractor, arms 120 are pivoted to the supports 118. In a manner similar to the preceding embodiment the ends of the arms 120 remote from the stub shafts 119 are fastened by means of stub shafts 121 to a support 122. As in the preceding embodiments a driver cabin 123, adapted to turn about a vertical axis and to be fixed in a plurality of positions is held on the support 122.

A number of horizontal rollers 124 are provided one behind the other on the upper side of the frame and extend at right angles to the direction of length of the frame.

An implement 125, for example, a combine harvester, can be arranged on the frame as is shown schematically in FIG. 15. The frame of the implement bears on the rollers 124. The frame of the implement is provided with pins 126, which are clamped to hooks 127 of the tractor frame. The hooks 127 are adapted to be displaced in a direction of height by means of hydraulic steering cylinders with respect to the frame of the tractor.

In operation, the driver cabin 123 will occupy the position indicated in FIG. 15 by broken lines, so that the driver's platform is at a comparatively low level above the ground. For disengaging the implement the cabin can be turned upwardly into the position shown in FIG. 15 by solid lines. For coupling and discoupling the implement 125, use may be made of a porch 128, provided with guiding beams 129 for the wheels 116 of the tractor so that, when the tractor is driven beneath the porch, the position of the tractor is correct with respect to the porch for coupling and discoupling. The porch is provided with pins 130. When the tractor with the implement is driven between the sides of the porch, brackets 131 of the implement automatically slip around the pins 130. When the implement is disengaged from the tractor and fastened to the porch by further means, the tractor can be driven backwardly so that the driver cabin 123 moves over the implement, while the implement can readily slide from the upper side of the tractor owing to the rollers 124. In this way large implements can be readily and simply coupled with the tractor.

Figure 18:
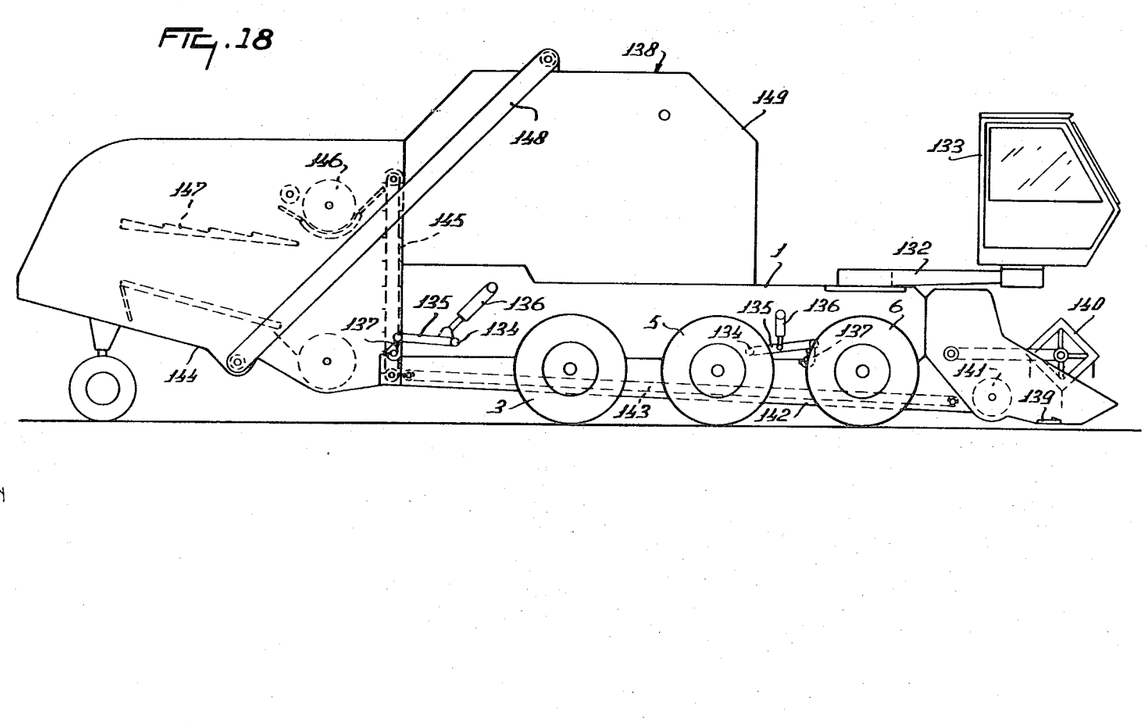
FIG. 18 shows a seventh embodiment of a tractor in accordance with the invention.

The tractor shown in FIG. 18 corresponds largely with the tractor of the first embodiment. Corresponding parts are designated by the same reference numerals. Near one end of the tractor, on one side, an arm 132 is coupled with the tractor frame and adapted to turn about a vertical shaft located on plan at the side of the beam 1. At the end of the arm 132 is arranged a driver cabin 133, which is also adapted to turn relatively to the arm about a vertical axis and to be fixed in a plurality of positions.

The tractor frame is provided with arms 135 adapted to pivot about horizontal shafts 134 and to be adjusted with the aid of hydraulic lifting cylinders 136. The ends of the arms 135 are provided with pivotable hooks 137. The tractor is illustrated in conjunction with an implement formed by a mower-harvester 138. A mowing mechanism 139, a reel 140 and a worm conveyor 141 of the combine harvester are located on one side of the tractor. Behind the worm conveyor 141 a gutter 142 accommodates a conveyor belt 143. The gutter 142 extends throughout the length of the tractor between the wheels 3, 5 and 6 beneath the frame and is clamped tight with the aid of the hooks 137 to the flat bottom side of the frame. The conveyor belt 143 joins the bottom side of a frame portion 144 coupled with the rear side of the tractor and comprising the threshing mechanism.

The crop conveyed by the conveyor belt 143 beneath the tractor is elevated by an elevator 145, accommodated in the frame portion 144 and fed to a threshing drum 146. From the threshing drum 146 the crop passes to a known sieving and cleaning mechanism 147, which is also accommodated in the frame portion 144 on the rear side of the tractor. The threshed grain is supplied by means of a conveyor 148 to a bunker 149, arranged on top of the tractor frame. In this way a combined harvester can be obtained from a few simple components, readily suitable for combination with a tractor to form a self-propelled harvester.

The tractors described above are preferably provided with a plurality of coupling points for attaching coupling members such as the arms 57 or the hooks 137, which can be actuated with the aid of the lifting cylinders pivoted to the frame. There are preferably provided a plurality of coupling points for such lifting cylinders.

Owing to the substantially flat upper side of the tractor frame and since the wheels do not project above the upper side of the tractor frame, the tractor is particularly suitable for attaching implements so that the latter extend at least partly across the frame. The adjustable seat in the driver cabin can always be set in an appropriate position.

It is particularly advantageous to provide the tractor in accordance with the invention with a loading surface so that the weight of the load bears directly on the tractor wheels. If, as is shown in FIGS. 2, 8, 11, 13 and 17 the driver's platform or seat has a width considerably smaller than the overall width of the vehicle with the loading surface, implements may be directly attached to the front side of the loading surface for feeding the material to the loading surface. These implements may be directly arranged in front of the foremost tractor wheels so that they can match the soil better. In addition, the combination of tractor, loading surface and implement can thus be maneuvered more rapidly, while the ground pressure at the foremost tractor wheels is lower than in the case in which the implements are arranged further in front.

Particularly when the tractor has all-wheel drive and all-wheel steering, the combination described of loading space, loading device and tractor can operate under the most difficult conditions. It is particularly advantageous that in accordance with the invention the loading surface and any implements can be detached in a simple manner from the tractor, so that the tractor being free of the weight of a loading space can be employed as a simple tractor for soil cultivation, mowing or sowing. Owing to the adjustable arrangement of the driver's platform not only implements attached to the front of the tractor but also implements attached to the rear side thereof can be supervised and monitored effectively.

What we claim is:

1. A tractor comprising a frame, an engine and a movable driver's platform, a plurality of ground wheels being mounted on each side of said frame and at least two of said ground wheels being in driving connection with said engine, said tractor having attachment means that position alternative agricultural attachment implement bodies on said frame with at least part of said attachment bodies being secured over the upper surface of said frame, said driver's platform being pivotally connected at the forward end of said frame and being pivotable about an axis mounted on said frame and movable from a position over said forward end to a position located at least partly beyond the outlines of said frame and in front of the forward wheels when said tractor is viewed in plan, said attachment means comprising a plurality of upwardly extending lifting cylinders and said implement bodies being attachable to the upper surface of said frame with the aid of said attachment means to occupy at least part of the forward end of said frame.

2. A tractor as claimed in claim 1, wherein said attachment means comprises lifting cylinders located on each side of said frame and adjacent the forward and rearward ends of said frame.

3. A tractor as claimed in claim 1, wherein coupling means are provided adjacent each end of said tractor to assist in positioning the attachment bodies.

4. A tractor as claimed in claim 1, wherein the upper part of at least one of said upwardly extending lifting cylinders in its withdrawn condition, is located at about the same level as the upper surface of said frame.

5. A tractor as claimed in claim 1, wherein at least one power take-off shaft from said engine is positioned at each end of said frame.

6. A tractor as claimed in claim 5, wherein at least one of said power take-off shafts is connectable to the driving shaft of said attachment.

7. A tractor as claimed in claim 1, wherein said driver's platform is pivotally connected to said frame by at least one pivotable arm which is turnable about said axis relative to said frame.

8. A tractor as claimed in claim 7, wherein said arm is pivotally connected to said frame and turnable about two axes located at one side of said tractor.

9. A tractor as claimed in claim 1, wherein said ground wheels have the same diameters.

10. A tractor as claimed in claim 1, wherein coupling means are associated with said frame and said coupling means has controls which are located to be actuated from said driver's platform.

11. A tractor as claimed in claim 1, wherein said attachment bodies are agricultural implements which rest on the upper surface of said frame.

12. A tractor as claimed in claim 1, wherein said attachment bodies comprise a bunker and a mowing mechanism with a crop pickup mechanism secured to the forward end of said tractor, and conveyor means mounted on said tractor to extend beneath said frame, whereby processed crop can be fed towards the back end of said tractor.

13. A tractor as claimed in claim 1, wherein the entire upper surface of said frame is flat and said attachment bodies rest on said surface.

14. A tractor as claimed in claim 13, wherein said frame is an elongated hollow beam which forms the upper flat surface of said tractor and which houses the engine.

15. A tractor as claimed in claim 1, wherein coupling means are associated with said frame and said coupling means include hooks which are pivotally connected to hydraulic cylinders at each end of said frame.

16. A tractor as claimed in claim 15, wherein said coupling means includes at least two hooks lying, one above the other, which are intercoupled by means of a coupling rod.

* * * * *